United States Patent [19]
Wagstaff et al.

[11] Patent Number: 5,465,658
[45] Date of Patent: Nov. 14, 1995

[54] TWINE CUTTING APPARATUS FOR ROUND BALER

[75] Inventors: Robert A. Wagstaff, Lancaster; John R. McClure, New Holland, both of Pa.

[73] Assignee: New Holland North America, Inc., New Holland, Pa.

[21] Appl. No.: 236,833

[22] Filed: May 2, 1994

[51] Int. Cl.⁶ .................................................. B65B 13/18
[52] U.S. Cl. .................... 100/5; 56/341; 100/13
[58] Field of Search .................................. 100/5, 13, 88; 56/341

[56]     References Cited
U.S. PATENT DOCUMENTS

| | | | |
|---|---|---|---|
| 2,468,641 | 4/1949 | Scranton et al. | 100/13 |
| 4,174,661 | 11/1979 | Mathes et al. | 100/13 |
| 4,440,075 | 4/1984 | Gaeddert | 100/5 |
| 4,505,197 | 3/1985 | Shenberger et al. | 100/5 |
| 4,715,175 | 12/1987 | Schaible et al. | 56/432 |
| 4,796,524 | 1/1989 | Renaud | 100/5 |
| 4,870,812 | 10/1989 | Jennings et al. | 56/341 |
| 5,184,545 | 2/1993 | Jennings et al. | 100/5 |
| 5,215,005 | 6/1993 | Schlotterbeck et al. | 100/5 |
| 5,349,806 | 9/1994 | Swearingen et al. | 100/5 |

*Primary Examiner*—Stephen F. Gerrity
*Attorney, Agent, or Firm*—Frank A. Seemar; Larry W. Miller

[57] ABSTRACT

A round baler having a pickup, a chamber for forming a cylindrical package of crop material and a generally transverse opening for feeding crop that has been picked up into the chamber. The baler includes a twine handling assembly having at least one twine arm with a twine dispensing end from which twine is dispensed in the vicinity of the transverse opening for applying a plurality of helical wraps on the cylindrical package of crop material formed in the chamber. Twine cutting apparatus is provided for cutting the twine, and a twine guide assembly is mounted to cooperate with the twine cutting apparatus to guide the twine to a cutting mechanism that is transferred to its operative position from a remote position after a predetermined amount of twine has been dispensed.

14 Claims, 12 Drawing Sheets

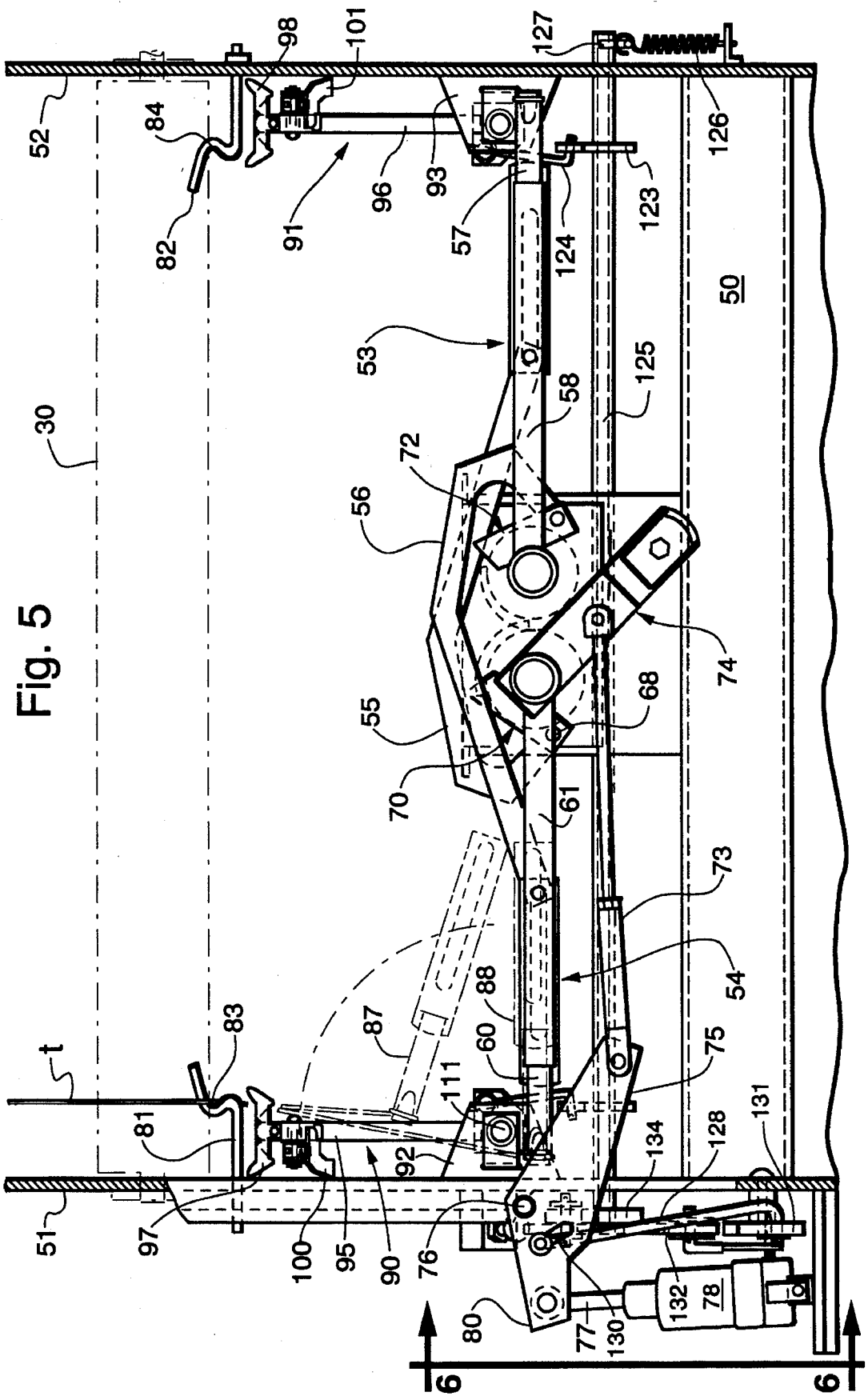

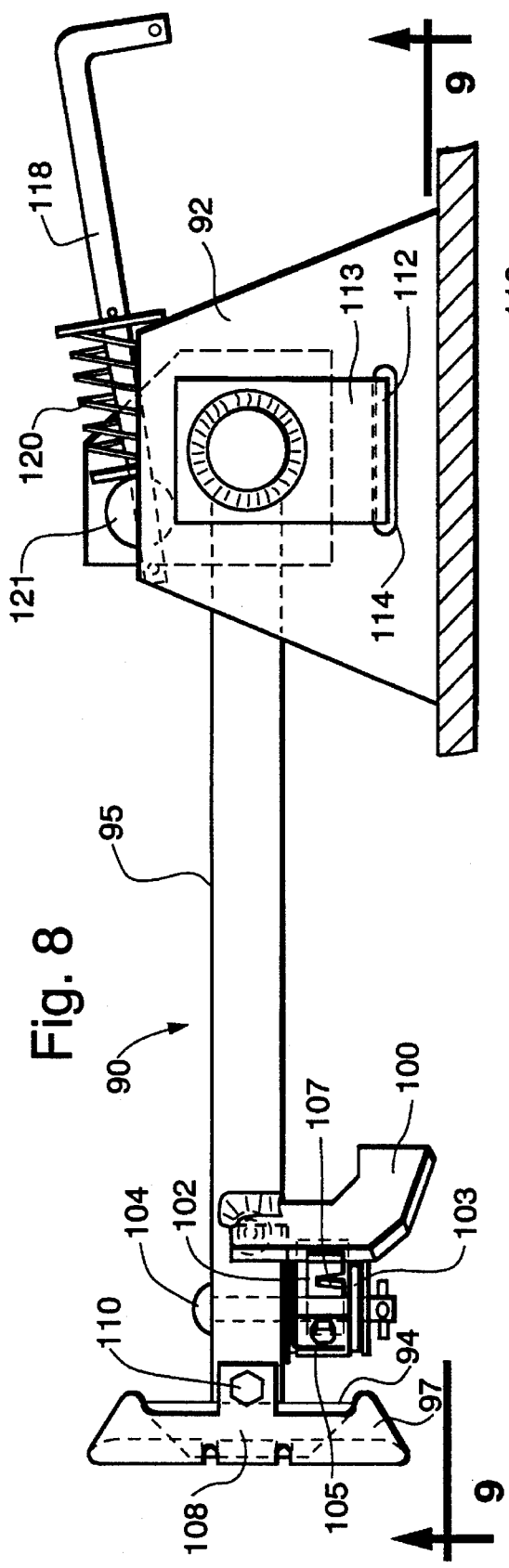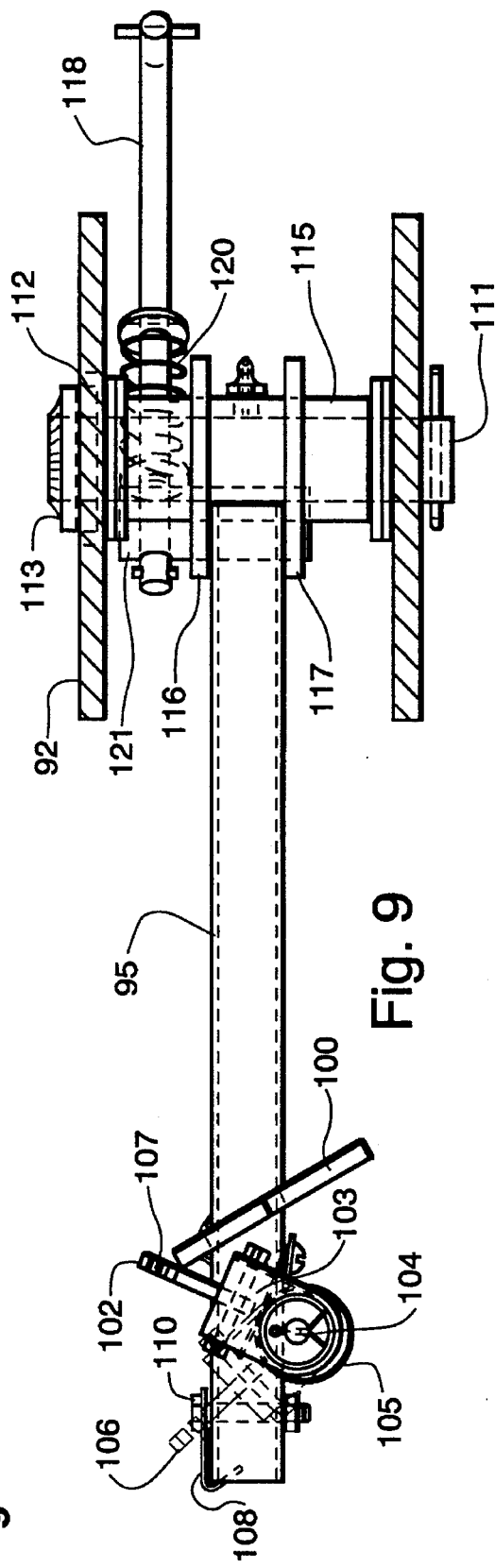

TWINE CUTTING APPARATUS FOR ROUND BALER

FIELD OF THE INVENTION

This invention relates generally to agricultural machines for making twine wrapped round bales, and more particularly to twine cutting apparatus for such machines.

BACKGROUND OF THE INVENTION

Agricultural machines towed by a tractor across a field for picking up windrowed crop material to form a cylindrical bale are commonly referred to as round balers. These machines have either a fixed or an expandable bale forming chamber disposed between opposing vertical sidewalls. The chamber is usually defined by a floor and transverse confining means comprising a continuous flexible apron and/or a plurality of transverse rolls. Frequently the apron includes an array of side-by-side belts trained around a series of rollers that extend between the sidewalls, and the floor consists of either a large roller or a continuous conveyor belt.

During field operation, crop material such as hay is picked up from the ground and fed into the chamber. The volume of crop material increases continuously in the chamber until a compact cylindrical package is formed. The package is wrapped while still in the chamber and then ejected onto the ground as a completed bale.

Well known means for wrapping round bales include twine, net and plastic sheet material. When twine is used it is common to utilize a tube to dispense twine along the circumference of the formed package as it is being rotated in the chamber to helically wrap a continuous strand of twine around the bale. The twine tube is moved to feed out twine along a transverse path adjacent the outer surface of the cylindrical package as it is being turned in the chamber. Twine wrapping apparatus of this type is shown in U.S. Pat. No. 5,215,005, issued Jun. 1, 1993 in the name of Stephen C. Schlotterbeck, et al.

When a sufficient amount of twine has been wrapped around the package the twine is cut, typically by guiding the twine to a stationary cutting mechanism which severs the strand by either a positive cutting action or by pulling it against a fixed cutting edge. Referring again to Schlotterbeck, et al, a stationary cutting mechanism is shown wherein the twine being dispensed is guided across a fixed striker plate and continues to feed out until a knife edge is thrust against the striker plate to sever the twine.

U.S. Pat. No. 4,440,075, issued Apr. 3, 1984 in the name of Melvin V. Gaeddert, also shows a round baler having a stationary cutting mechanism. The twine is guided to the cutting mechanism and severed by pulling it against an exposed cutting edge.

In another prior art arrangement, shown in U.S. Pat. No. 4,505,197, issued Mar. 19, 1985 in the name of Paul S. Shenberger, et al, the twine cutting mechanism includes a swinging arm that engages the twine and pulls it against a knife. The arm in this device also serves to clamp the supply end of the twine after it is severed.

Another known approach in the round baler prior art is the use of a cutting mechanism that is not stationary. U.S. Pat. No. 4,715,175, issued Dec. 29, 1987 in the name of Siegfried Schaible, et al, shows round bale wrapping apparatus in which a cutting mechanism is slideably moved to its cutting position after the wrapping operation is completed.

As in all aspects of round balers, reliability is a very important factor in the twine cutting operation. Serious problems are encountered if the cutter fails, i.e., the twine has not been severed prior to ejection or is some instances the twine continues to feed out long after a sufficient amount of twine has been wrapped around the package of crop material. Due to the location of many prior art cutting mechanisms in an environment that is inherently dusty, failures occur due to build up of dirt and debris in the vicinity of the twine strand to be cut, causing the cutting edge to be blocked from contact or to make improper contact.

SUMMARY OF THE INVENTION

An important object of the present invention is to provide improved twine cutting apparatus for a round baler which enhances the reliability of the baler without affecting the overall performance.

In pursuance of this and other important objects the present invention provides for new and unique twine cutting apparatus in a round baler comprising a chamber for forming a cylindrical package of crop material, a generally transverse crop infeed opening in the chamber, a pair of sidewalls, and a twine handling assembly mounted between the sidewalls and forwardly of the opening. The twine handling assembly includes at least one twine arm having a twine dispensing end from which twine is dispensed in the vicinity of the infeed opening and fed therethrough for applying a plurality of helical wraps on the cylindrical package of crop material formed in the chamber. The baler further comprises twine cutting apparatus having a twine cutting mechanism for cutting the twine, and a twine guide assembly mounted on one of the side walls for guiding the twine to the cutting mechanism after a predetermined amount of twine has been dispensed. The present invention more specifically contemplates twine cutting apparatus in which means are provided for moving the twine cutting mechanism from a remote inoperative position to an operative position adjacent one of the sidewalls.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE DRAWINGS

FIG. 4 is a view similar to FIG. 3 and shows the twine dispensing arms extending rearwardly.

FIG. 8 is a plan view of the twine cutting assembly of the present invention.

FIG. 9 is a view taken in the direction of arrows 9—9 in FIG. 8.

DESCRIPTION OF THE PREFERRED EMBODIMENT

Figure 1:
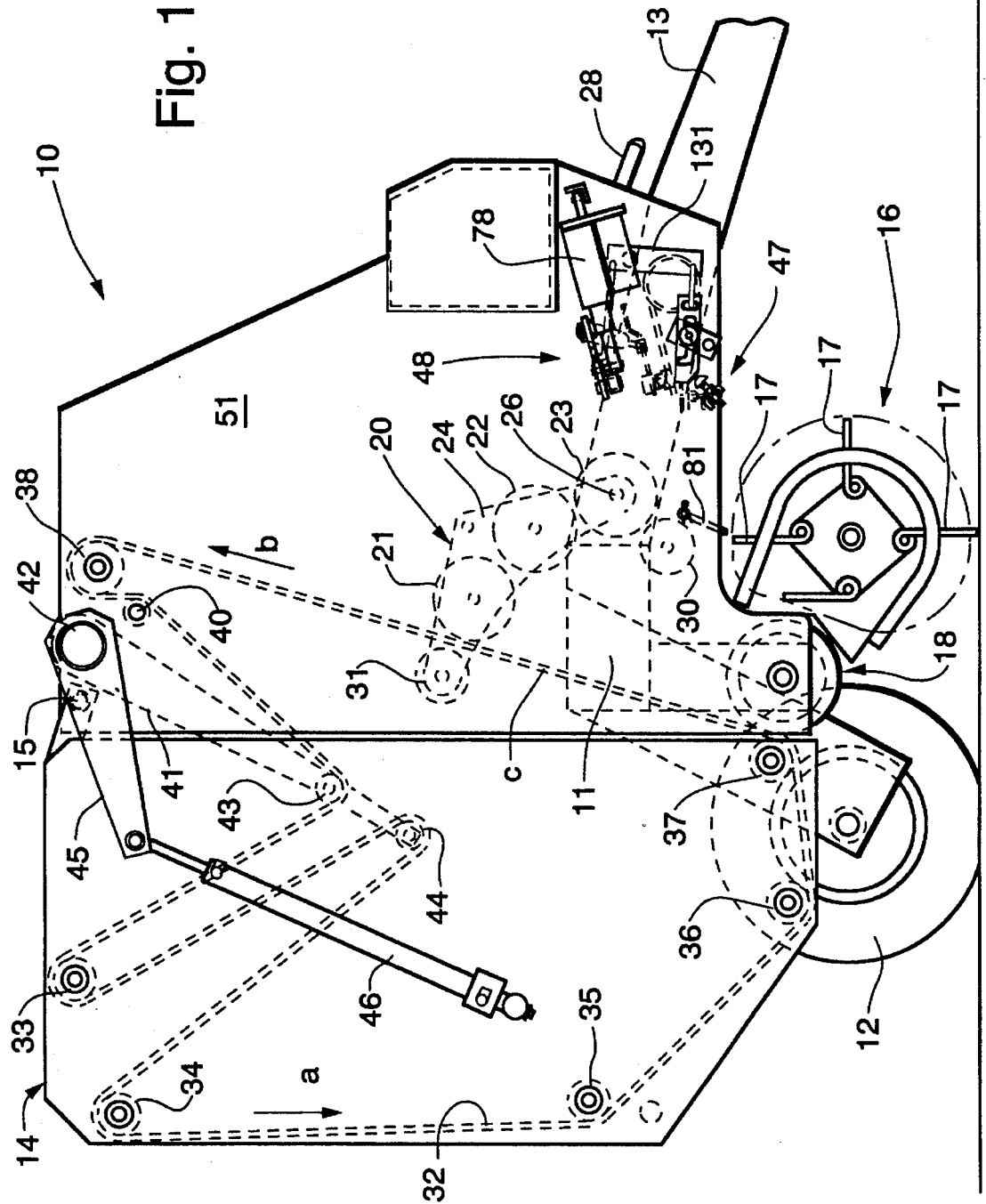
FIG. 1 is a diagrammatic side elevational view of a round baler in which the present invention is incorporated.

Referring now to the drawings for a more detailed description of the preferred embodiment of the invention, FIG. 1 shows a round baler 10 of the type having an expandable chamber defined by belts and rollers, as generally disclosed in U.S. Pat. No. 4,870,812, issued Oct. 12, 1989 in the name of Richard E. Jennings, et al.

Figure 2:
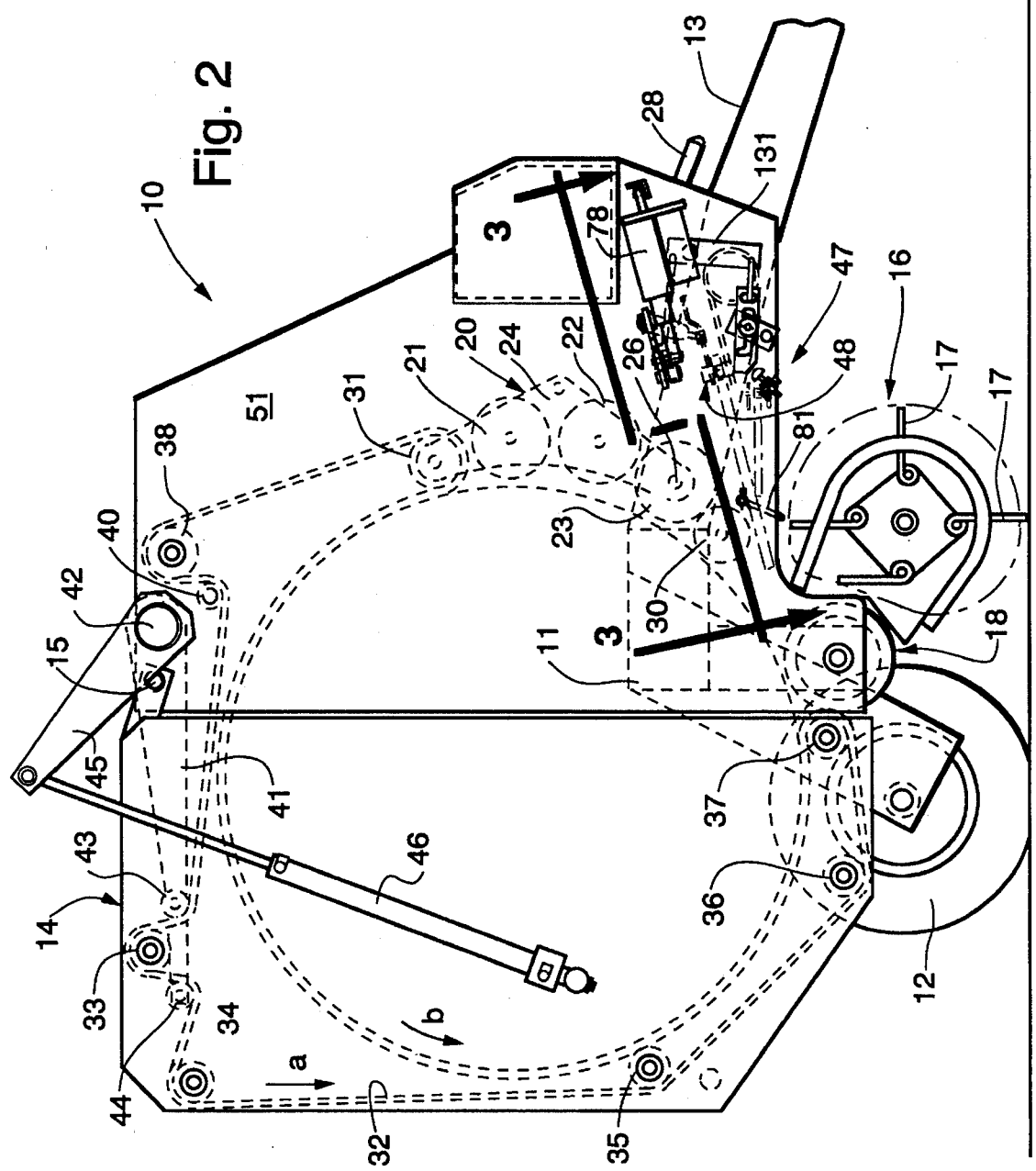
FIG. 2 is a diagrammatic side elevational view, similar to FIG. 1, of a round baler with its forming chamber in the full bale position.

Round baler 10, which incorporates the preferred embodiment of the present invention, includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, includes a plurality of fingers or tines 17 movable in a predetermined path to lift crop material from the ground and deliver it rearwardly toward a floor roll 18, rotatably mounted on main frame 11.

A chamber for forming bales is defined partly by a sledge assembly 20 comprising a plurality of rollers 21, 22, 23 extending transversely of the main frame 11 in the arcuate arrangement seen in FIG. 1 and 2. Rollers 21, 22, 23 are journalled at their ends in a pair of spaced apart arms 24, one of which is shown. These arms are pivotally mounted inside main frame 11 on stub shafts 26 for providing movement of sledge assembly 20 between the bale starting position shown in FIG. 1 and the full bale position shown in FIG. 2. Rollers 21, 22, 23 are driven in a counter-clockwise direction by conventional means (for example, chains and sprockets) connected with a drive shaft 28 which in turn is connected to the power-take-off of a tractor. A starter roll 30, located adjacent roller 23, is also driven counter-clockwise. A freely rotatable idler roller 31, carried by arms 24, moves in an arcuate path with sledge assembly 20.

The bale forming chamber is further defined by an apron 32 comprising a plurality of continuous side-by-side belts supported by guide rolls 33, 34, 35, 36, 37 rotatably mounted in tailgate 14. Apron 32 is also supported on a drive roll 38, mounted on main frame 11. Although apron 32 passes between roller 21 on sledge assembly 20 and idler roller 31, it is in engagement only with idler roller 31 and not roller 21 which is located in close proximity to the apron belts and serves to strip crop material from the belts, in addition to its bale forming function. Suitable coupling means (not shown) connected to drive shaft 28 provide rotation of drive roll 38 in a direction causing movement of apron 32 along the varying paths indicated generally by arrows a and b in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions shown in FIGS. 1 and 2, respectively. Belt tension lever arms 45 (one shown) are also mounted to pivot with take up arms 41, which carry additional guide rolls 43, 44 for supporting apron 32. An hydraulic cylinders 46 is mounted on tail gate 14 and normally urges lever arms 45 and take up arms 41 toward their inner positions (FIG. 1), as the bale diameter increases.

When the elements of round baler 10 are disposed as shown in FIG. 1 with tailgate 14 closed, an inner course c of apron 32 extends between guide roll 37 and idler roll 31. Rollers 21, 22, 23 are inclined rearwardly on sledge assembly 20 to define with course c the bale core starting chamber. Apron inner course c forms the rear wall of the chamber while the inwardly facing peripheral surfaces of rollers 21, 22, 23 define in a general manner a rearwardly inclined cooperating front wall. Floor roll 18 defines the bottom of the chamber and starter roller 30, spaced from floor roll 18, provides the upper boundary of an inlet for crop material.

As round baler 10 is towed across a field, pickup tines 17 lift crop material from the ground and deliver it through the inlet. The crop material is carried rearwardly by floor roll 18 into engagement with apron inner course c (FIG. 1) which urges it upwardly and slightly forwardly into engagement with rollers 21, 22, 23. In this manner crop material is coiled in a clockwise direction to start a bale core. Continued feeding of crop material into the bale forming chamber by pickup tines 17 causes the apron inner course c to expand in length around a portion of the circumference of the bale core as the diameter increases. Take up arms 41 rotate conjointly with lever arms 45 from their inner positions shown in FIG. 1 toward their outer positions shown in FIG. 2 to provide for expansion of the inner course of the apron in a well known manner, i.e., in effect the outer course of the belts of apron 32 is diminished in length while the inner course increases a like amount. After a bale has been formed and wrapped, tailgate 14 is opened and the bale is ejected rearwardly. Subsequent closing of tailgate 14 returns the apron inner and outer courses of the belts of apron 32 to the locations shown in FIG. 1.

During bale formation, sledge assembly 20 also moves between a bale starting position (FIG. 1) to a full bale position (FIG. 2). This movement of sledge assembly 20 causes idler roller 31 to move in an arcuate path while maintaining apron 32 in close proximity to roller 21, thereby allowing roller 21 to strip crop material from the belts of apron 32 and prevent or reduce significantly the loss of crop material between roller 21 and apron 32 during formation of a bale. Sledge assembly 20 is pushed outwardly towards its full bale position during bale formation as the crop material expands against rollers 21, 22, 23 and then subsequently is pulled inwardly by apron 32 to the position shown in FIG. 1 during bale ejection.

Before turning to the twine cutting apparatus of the present invention, which apparatus is generally designated by reference numeral 47 in FIGS. 1 and 2, reference is made to U.S. Pat. No. 5,184,545, issued Feb. 9, 1993 in the name of Richard E. Jennings, et al, which is directed to automatic twine wrapping apparatus, hereby incorporated by reference. The Jennings, et al twine wrapping apparatus is similar to the twine wrapping apparatus used in baler 10 and generally designated by reference numeral 48 in FIGS. 1 and 2.

Figure 3:
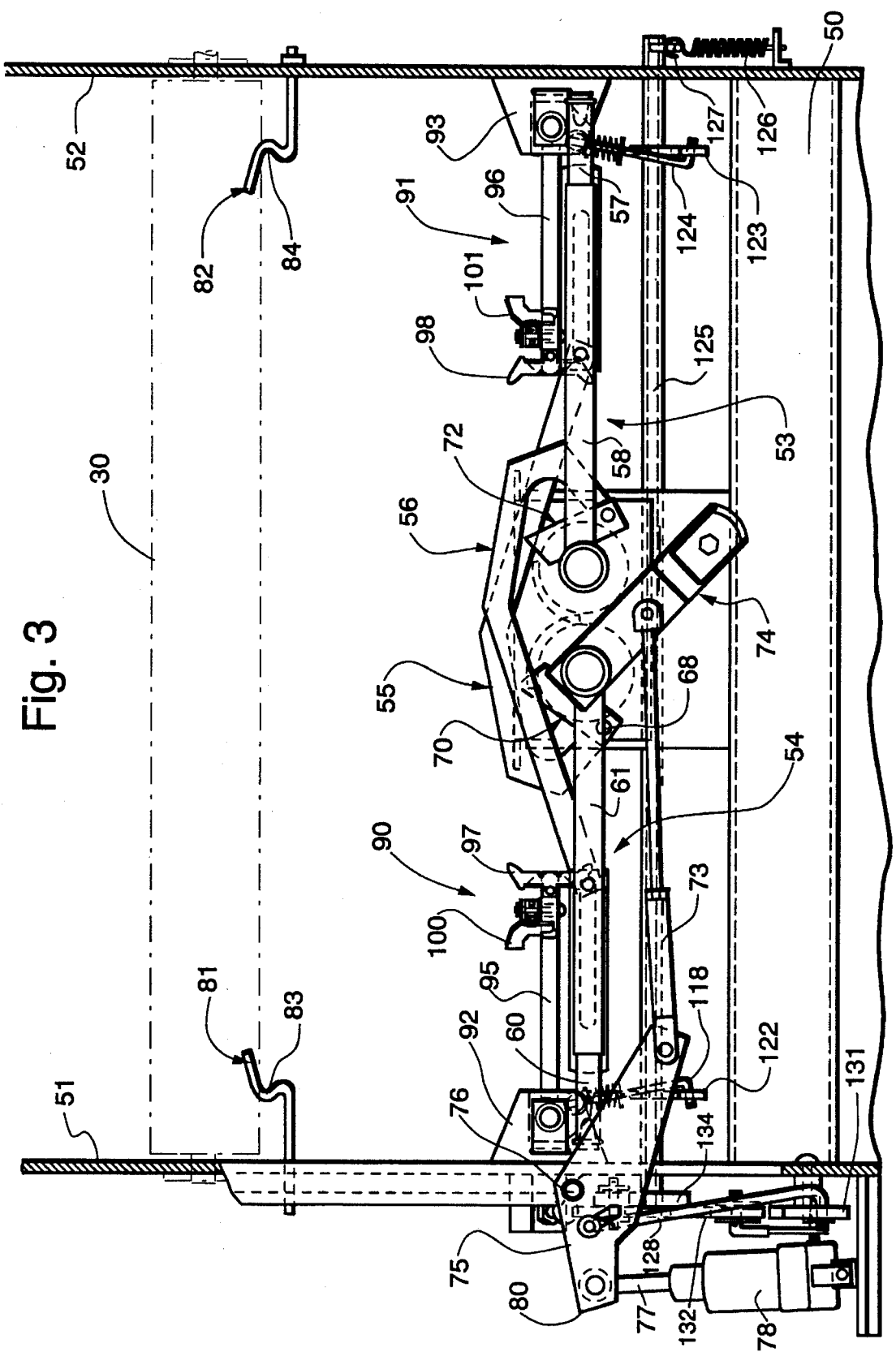
FIG. 3 is a view taken in the direction of arrows 3—3 in FIG. 2.

Now turning to FIGS. 3 and 4 for a detailed description of twine wrapping apparatus 48, a frame member 50, mounted between sidewalls 51, 52, supports a pair of twine arms 53, 54 shown in their home position in FIG. 3 and in their rearwardly extended position in FIG. 4. The arms, coupled together by first and second link members 55, 56, each comprise first and second members 57, 58 and 60, 61. The second members are each telescopically mounted within its corresponding first member, and a twine dispensing end 62, 63 is disposed at the outer ends of each of the second members. The link members have outer ends 64, 66 and inner ends 65, 67 (see FIG.4) whereby the outer end of each is pivotally coupled to the second member of one of the twine arms and the inner end is attached to the first member of the other twine arm. More specifically, first link member 55 comprises outer end 66 and inner end 67, the inner end of which is pivotally connected, via a pivot pin 68, to a rigid strap 70, which in turn is affixed to first member 58 of twine arm 53. Likewise, second link member 56 comprises outer end 64 and inner end 65, the inner end of which is pivotally connected, via pivot pin 71, to rigid strap 72, which in turn is affixed to first member 61 of twine arm 54.

Twine arm 53 is driven in a counter clockwise direction and twine arm 54 is driven in a clockwise direction when the driven link 73 urges link 74 from the position shown in FIG. 4 to the position shown in FIG. 3. Due to the unique coupling arrangement between the twine arms, which is shown and explained in detail in the Jennings et al patent, the twine arms rotate from the position shown in FIG. 4 to the position shown in FIG. 3 with the second member of each arm retracting within the first member of each arm.

Driven link 73 is pivotally attached to plate 75, which is rotated about pivot 76 when actuator arm 77 (of actuator 78), affixed to plate 75 at end 80, reciprocates between the retracted and extended positions, shown in FIGS. 3 and 4. Thus, when actuator arm 77 is fully extended as shown in FIG. 4, twine arms 53, 54 are in their rearwardly extending position, and when actuator arm 77 is in the retracted condition shown in FIG. 3, twine arms 53, 54 are in their home position.

A pair of twine guides 81, 82, each of which is in the general configuration of an S shaped rod, extend inwardly from and are affixed to side walls 51, 52, respectively. These guides are positioned to receive the twine in bights 83, 84 as it is being dispensed from the twine arms to the ends of a round bale being wrapped in a customary fashion. FIG. 4 depicts four partial phantom views, 85, 86, 87, 88 of twine arm 54 to illustrate the position of twine t relative to guide 81 as the twine approaches guide 81 (sequential positions 85 and 86) and is ultimately guided in bight 83 (position 87). Finally, twine t remains guided by bight 83 as twine arm is about to come to rest in its home position (position 88). A similar series of positions take place with respect to twine arm 54 and guide 82 when the twin twine arm system shown is employed.

FIGS. 3 and 4 show twine cutting assemblies 90, 91 in transversely oriented home positions, generally parallel to frame member 50. Even though a twin twine cutting arrangement is shown operative with twin twine dispensing arms, it should be clear that the present invention will function equally as well in a single twine arrangement. Accordingly, the following description will in some instances, for the sake of convenience, be directed only to twine cutting assembly 90, but it is the intention that it apply equally to twine cutting assembly 91.

Figure 5:
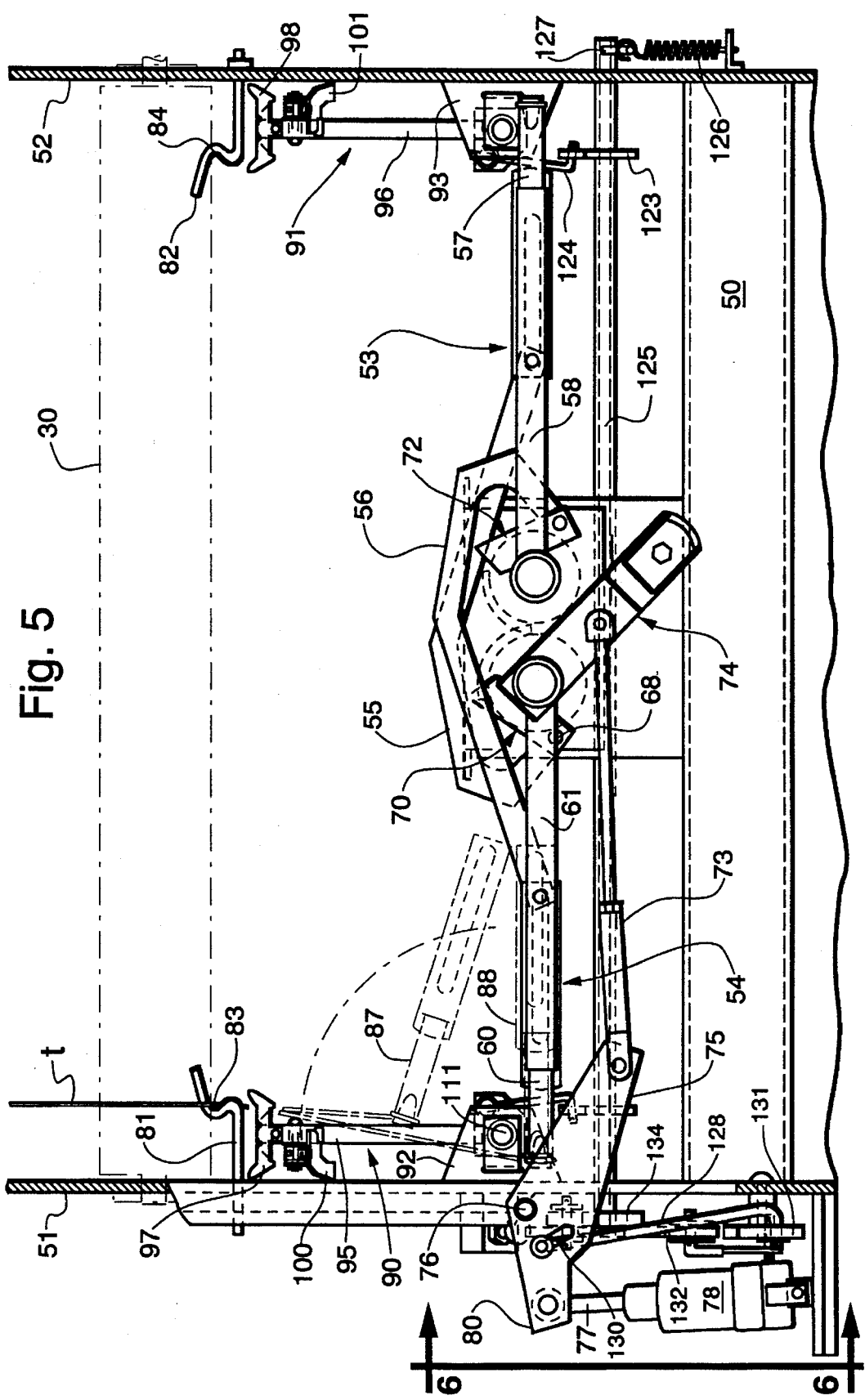
FIG. 5 is also a view similar to FIG. 3 and shows the twine cutting arms extending rearwardly.

Twine cutting assemblies 90, 91 are pivotally mounted on brackets 92, 93, affixed and extending inwardly from side walls 51, 52, to permit reciprocative operation between the home positions shown in FIG. 4 and the extended positions shown in FIG. 5. Each assembly includes a knife 94 (see FIG. 8) mounted on the outer end of a support arm 95, 96, first and second fixed twine guide plates 97, 98 and 100, 101, respectively, and a moveable twine guide plate 102, all of which plates operate in a manner described below to guide twine to the knife. As clearly shown in FIGS. 8 and 9, moveable twine guide plate 102, is pivoted with mounting block 103 via pin 104, and is urged into the position shown in solid lines by coil spring 105, wrapped around block 103 and secured to support arm 95. Block 103 is free to pivot about pin 104 to phantom position 106 (FIG.9) against the force of spring 105, i.e., when the force of spring 105 is overcome. A V shaped notch 107 in moveable twine guide plate 102 is positioned to be slightly above the top edge of fixed twine guide plate under conditions where block 103 is urged into its rest position. The importance of notch 107 in moveable guide plate 102, as well as its shape, will become apparent in the description of the operation.

Again referring to FIGS. 8 and 9, knife 94 is illustrated as being held in a symmetrical bracket 108, the outer edge of which comprises first twine guide plate 97, affixed to the outer end of support arm 95 by bolt 110. The purpose of this unique shape is to permit the twine cutting assembly to be readily adapted for use on either side of the baler. Also, only half of the cutting edge of knife 94 is operative which leaves the other half available for use by simply loosening bracket 108 and reversing the position of the exposed ends of the cutting edge.

Twine cutting assembly 90 is pivotally mounted to bracket 92 via pin 111 secured to bracket 92 by flange 112 extending from securing plate 113 and affixed in slot 114. Support arm 95 is secured to sleeve 115 and rotates about pin 111 with sleeve 115 when movement is imparted via mounting shoulders 116, 117 attached thereto. Thus, when rod 118 is driven in a generally rearward direction it urges compressed spring 120 against vertical pin 121 and thereby rotates support arm 95 to the position shown in FIG. 8 by virtue of the movement of pin 121 in an arcuate path counterclockwise about vertical pin 111, which moving pin is accommodated by appropriate holes in shoulders 116, 117 with diameters slightly greater than the diameter of such pin. Twine cutting assembly 90 is also shown in its extended position in FIG. 5, whereas in FIG. 4 it has been returned to its home position by rod 118.

Figure 6:
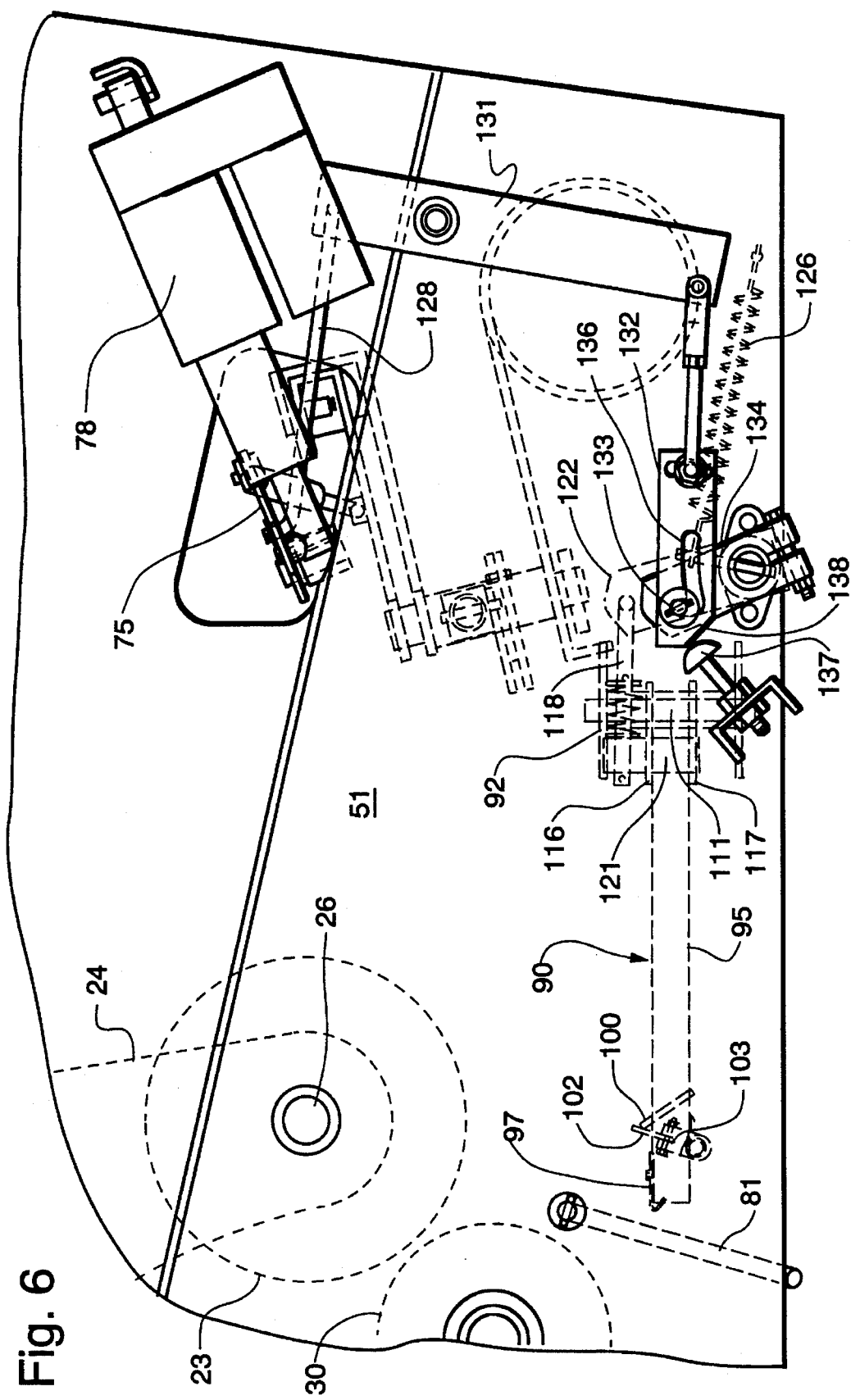
FIG. 6 is a view taken in the direction of arrows 6—6 in FIG. 5.
Figure 7:
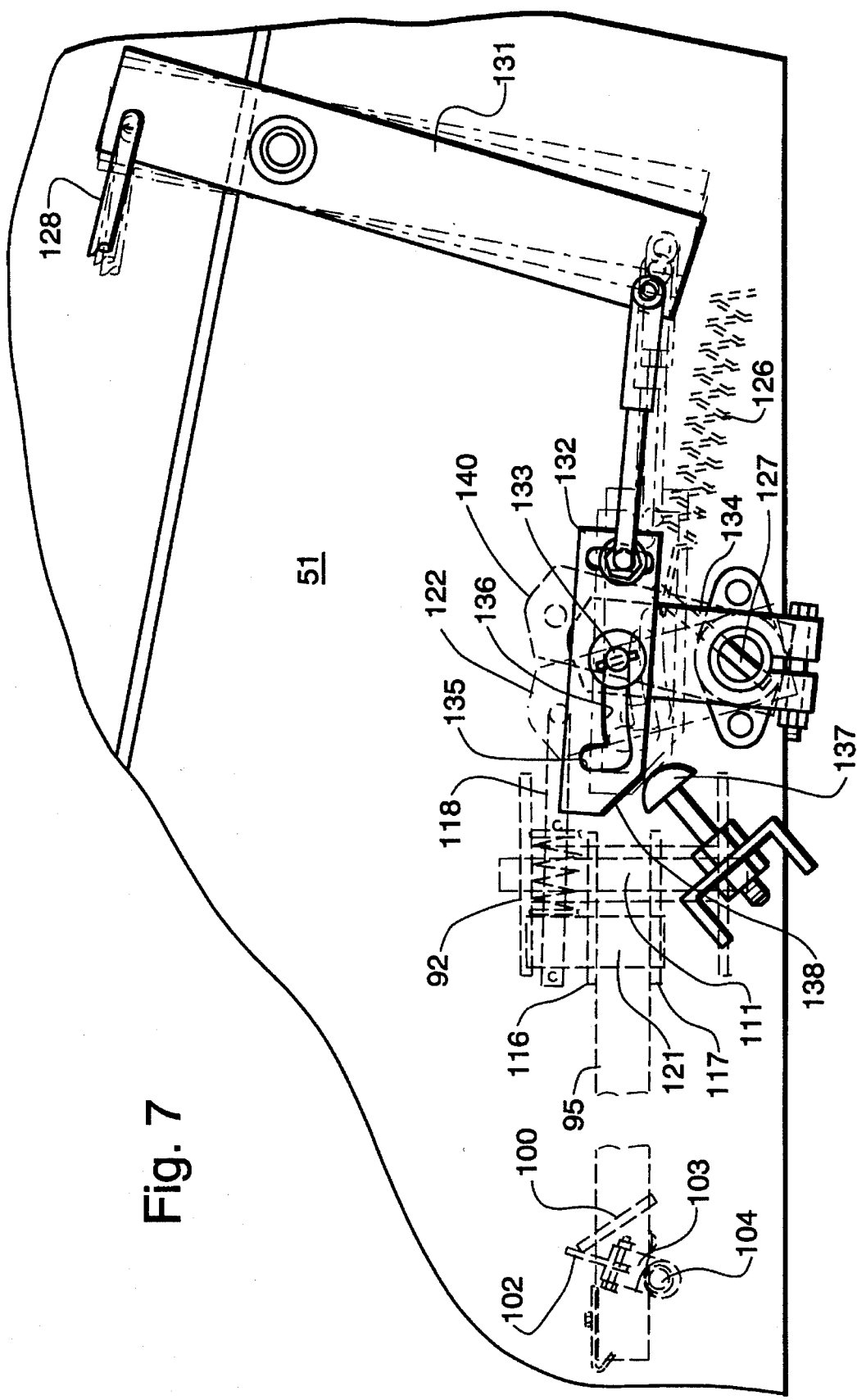
FIG. 7 is an enlarged view similar to FIG. 6 illustrating the operative relationship of selected elements.

A pair of legs 122, 123, coupled to rods 118, 124, are attached to transverse drive rod 125 to move twine cutting assemblies 90, 91 from the home position (FIG. 4) to the extended position (FIG. 5) when transverse drive rod 125 is rotated to move the legs from right to left, as viewed in FIG. 6, where leg 122 is shown. Drive rod 125 is urged in a clockwise direction by spring 126, which is under tension and maintains a torque on drive rod 125 via pin 127, as shown in FIG. 7, to return the twine cutting assemblies to their home positions when drive rod 125 is released in a manner discussed below.

The drive arrangement for the twine cutting assemblies is synchronized with the drive arrangement for the twine arms, both of which are moved from home positions to operative positions and back to home by actuator 78. Initially actuator arm 77 is in the retracted position shown in FIG. 3 and the twine dispensing arms 53, 54 and twine cutting assemblies 90, 91 are in their transverse home positions, substantially parallel to frame member 50. When plate 75 is pivoted to move the twine dispensing arms to the position shown in FIG. 4, the twine cutting assemblies remain in the home position. During the latter part of the travel of twine dispensing arms through the positions shown in phantom in FIG. 4, twine cutting assemblies 90, 91 are moved to their rearwardly extending positions shown in FIG. 5 when actuator arm is retracted to the point where rod 128 is engaged by the rearward limit of lost motion slot 130.

Now turning to the specific details of the twine cutting assembly drive shown in FIG. 6, rod 128 is moved to the right by plate 75 to cause leg 131 to pivot in a clockwise direction and move cutter drive plate 132 to the left. This in turn moves pin 133, extending from pivot arm 134, to the left along with leg 122 which is affixed to transverse drive rod 125. As leg 131 is continued in a clockwise direction by virtue of actuator arm 77, pin 133 is urged out of the detent portion 136 of slot 136 in cutter drive plate 132 by engagement of plow bolt 137 with the cam surface 138 of cutter drive plate 132. Leg 122 and pivot arm 134 are then free to rotate in a clockwise direction with transverse drive rod 125 under the force of spring 127, shown in more detail by the right most position 140 of leg 122 and pivot arm 134 in FIG. 7, which returns twine cutting assembly 90 from the extended position (FIGS. 6 and 7) to its home position.

In operation, twine cutting assembly captures and cuts twine t, as it is held in position by twine guides 81, 82, during its travel from its home position to its fully extended position. Upon arrival of twine cutting mechanism at its fully extended position, it is released and automatically returned to its home position. Thus the cutting mechanism is only in the vicinity of the bale forming environment during the very short period of time necessary to accomplish twine cutting.

Figure 10A:
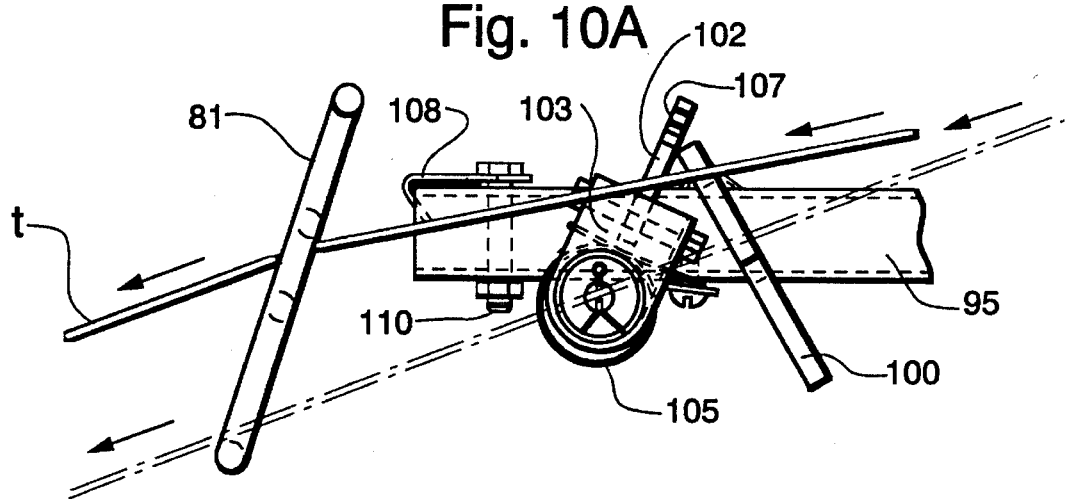
FIGS. 10A 10C, 10E and 10G are side elevational views showing a sequence of the relative positions of various elements of the twine cutting mechanism of the present invention.
Figure 10B:
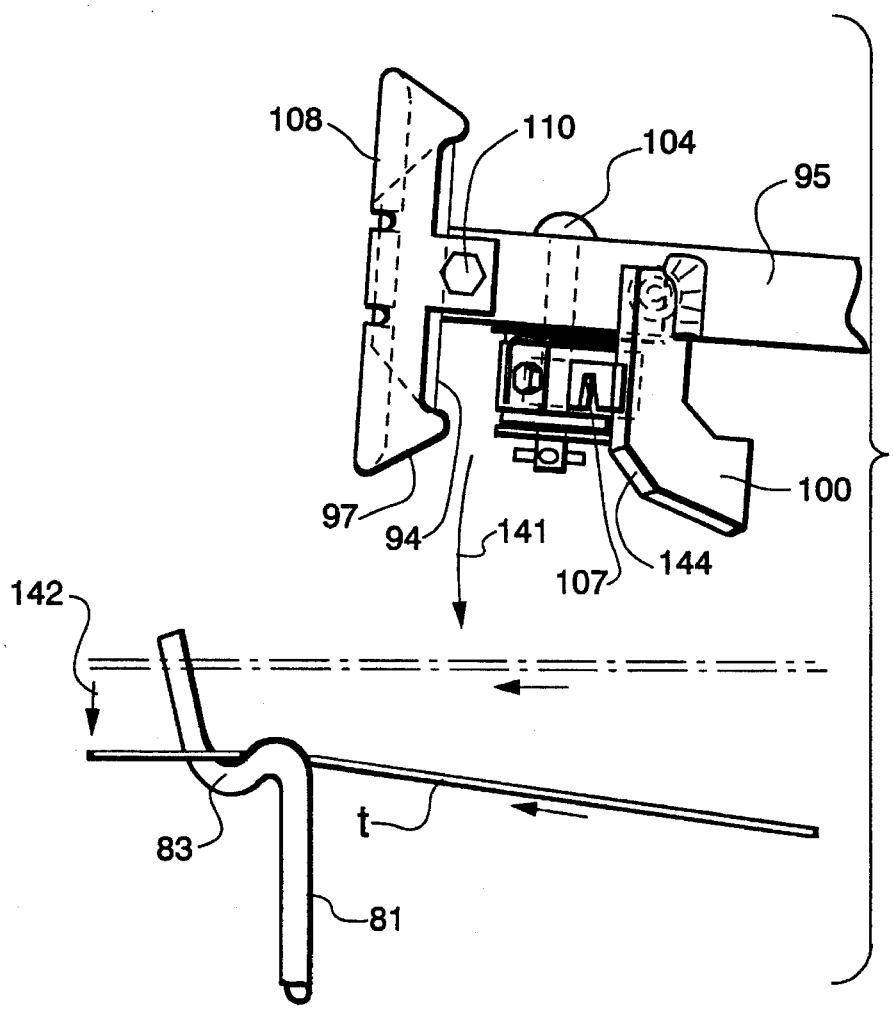
FIGS. 10B, 10D 10F and 10H are plan views corresponding to FIGS. 10A, 10C, 10E and 10G, respectively.

Now turning to the sequential views of FIGS. 10A through 10H for a more detailed description of the operation, twine t is shown traveling toward the bale being wrapped in the bale chamber defined by apron 32 (FIG. 2). In FIGS. 10A and 10B the twine cutting assembly is shown as it is swinging in the direction of arrow 141 just prior to capturing twine t, and twine t is shown in phantom prior to being guided by bight 83 of guide 81, i.e., the path of travel of twine t is being shifted in the direction of arrow 142 by the swinging motion of the twine arm, as illustrated in FIG. 4.

Figure 10C:
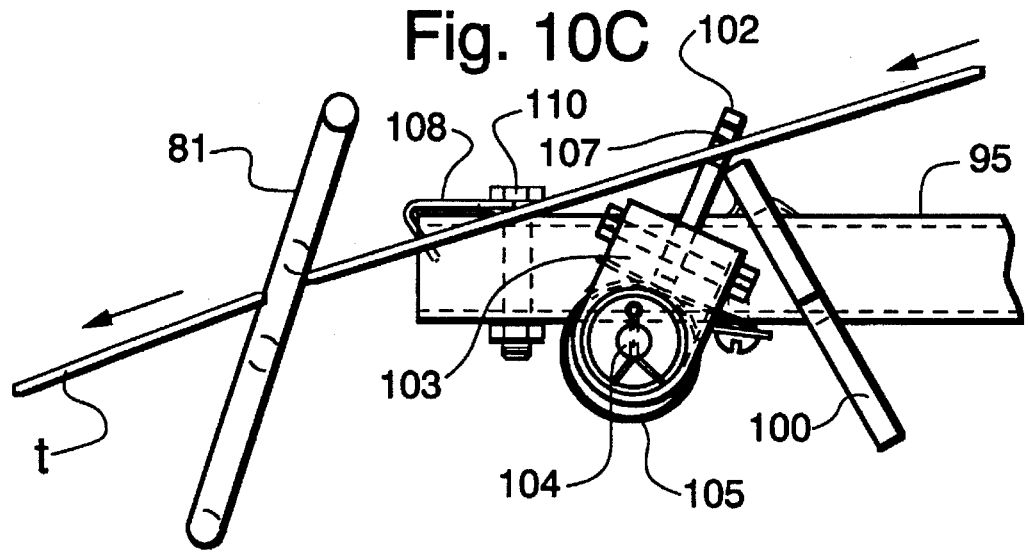
Figure 10D:
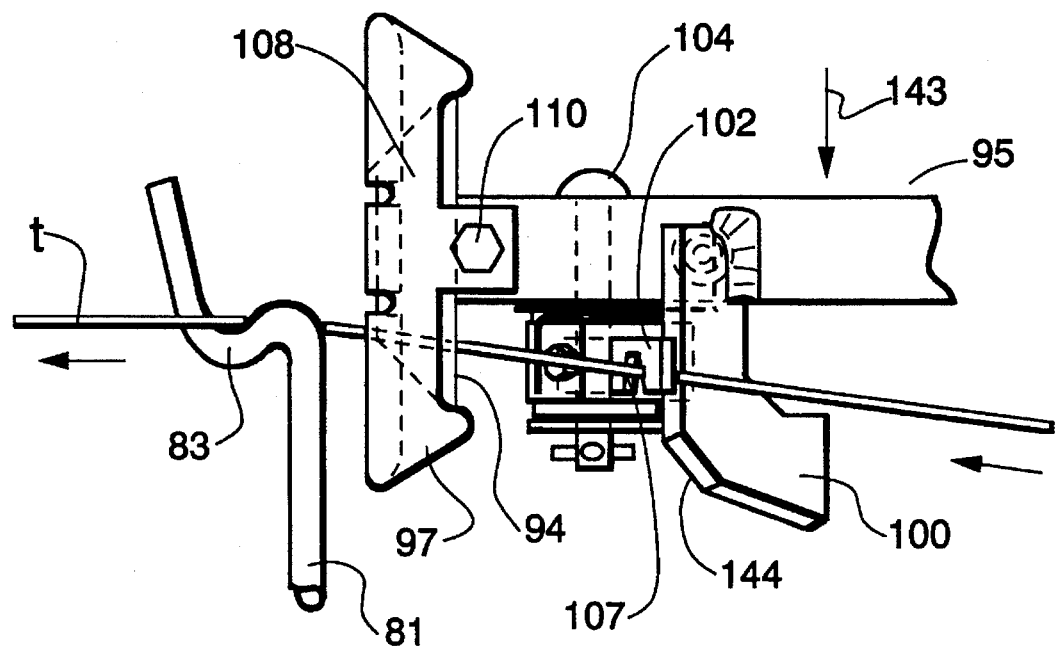

In FIGS. 10C and 10D the cutting assembly continues to swing in the direction of arrow 143 and has captured twine t which is still dispensing toward the bale chamber and is guided in bight 83. During the capturing process, moving twine t is engaged by second twine guide plate 100 (see relationship of twine and guide in FIG. 10A) to guide the twine to the moveable twine guide plate 102, and first twine guide plate 97 if necessary, to assure that it rides up the slanted surface 144 of second guide plate 100 and into notch 107.

As twine t engages V shaped notch 107, moveable guide plate 102 begins to pivot (FIGS. 10E and 10F) in a counter clockwise direction (see arrow 145) by virtue of the frictional force imparted by the twine which is being pulled through the notch in the direction of the bale being wrapped. The twine path moves along the notch until it is firmly gripped by the sides of the notch to maintain pivotal motion. Twine cutting assembly 90 continues to swing in the direction of arrow 146 which motion, along with S shaped twine guide 81, assures that the twine will remain securely clenched by the V shaped notch 107 in guide 102.

Figure 10E:
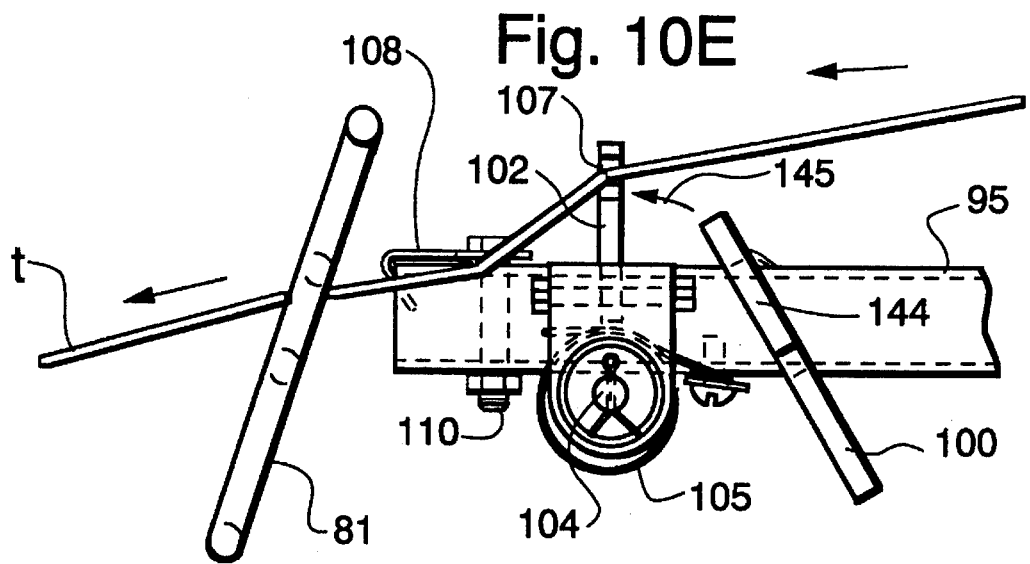
Figure 10F:
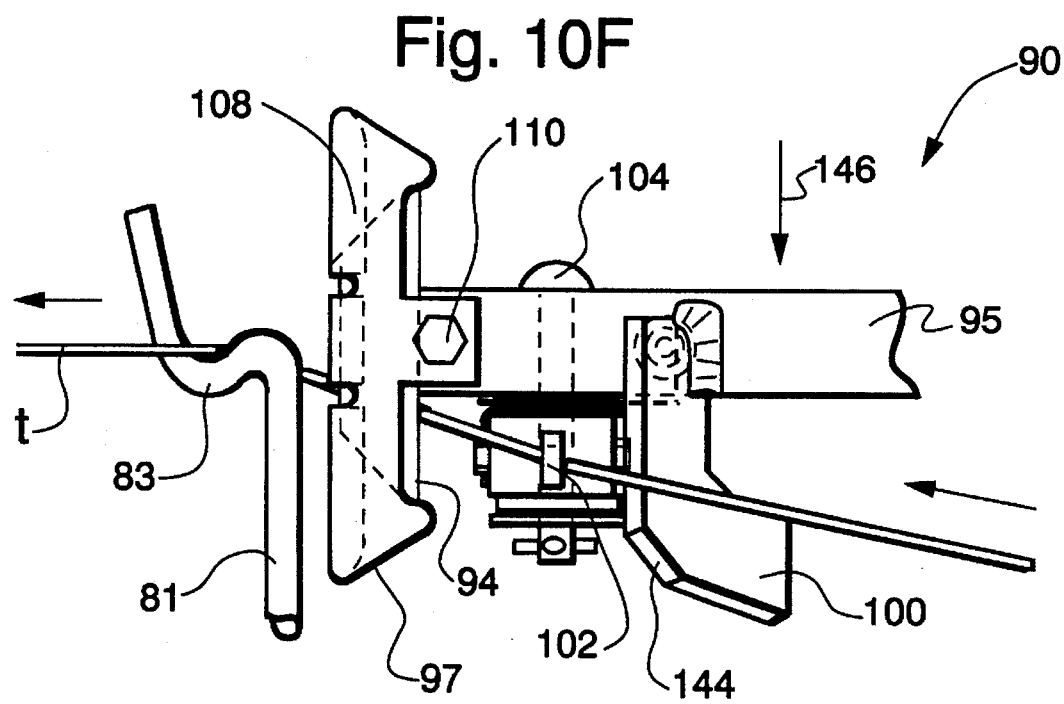
Figure 10G:
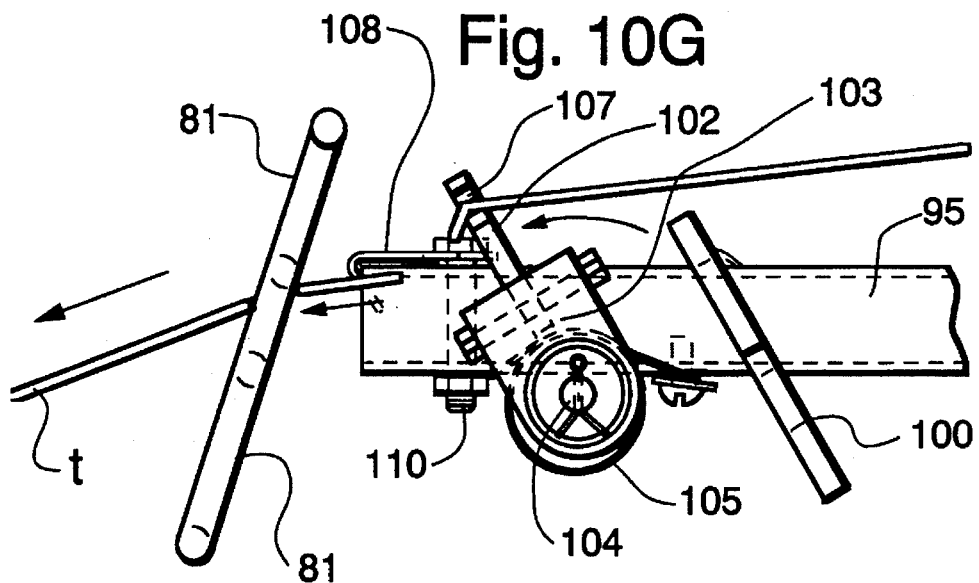
Figure 10H:
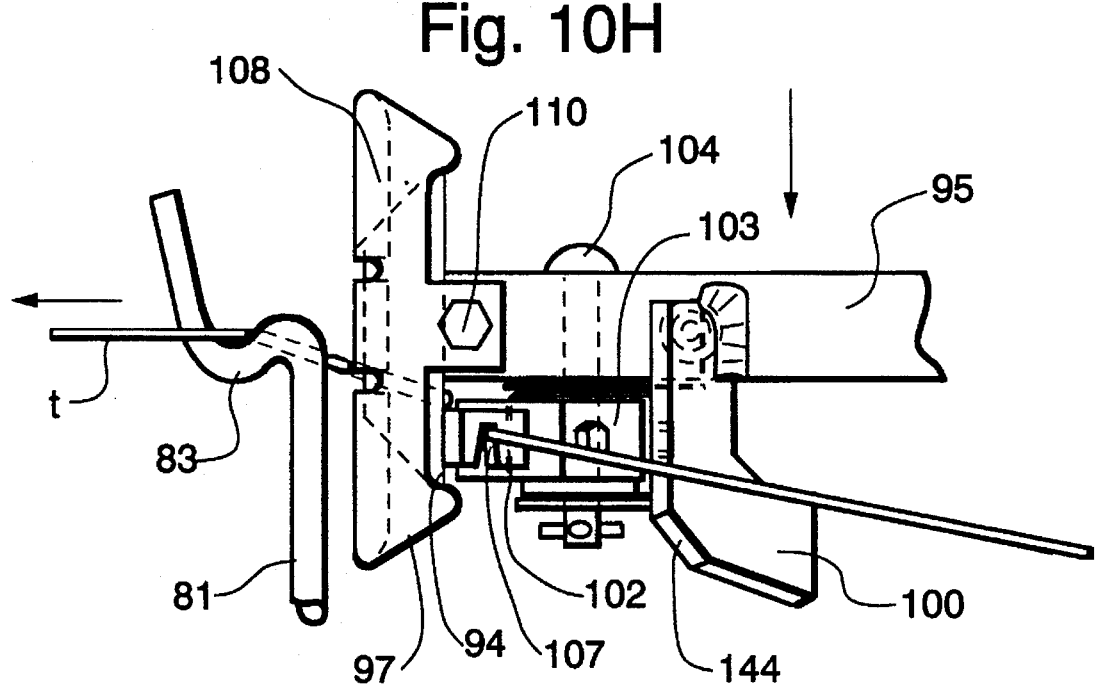

The angle between the twine and knife 94 increases as moveable twine guide plate continues to pivot from the position show in FIG. 10E to the position shown in FIG. 10G. This results in the twine being cut cleanly and decisively as it continues to be dispensed and pulled against and along the cutting edge as shown in FIG. 10H. As soon as the twine has been cut (FIG. 10G) the moveable twine guide will return by spring 105 from the position shown in FIG.10G to the position shown in FIG. 10A and twine cutting assembly will spring back to its home position as discussed above.

While preferred structure in which the principles of the present invention have been incorporated is shown and described above, it is to be understood that the invention is not limited to such structure, but that, in fact, widely different means of varying scope and configuration may be employed in the practice of the invention.

Having thus described the invention, what is claimed is:

1. In a round baler comprising a chamber for forming a cylindrical package of crop material, a generally transverse crop infeed opening in said chamber, a pair of sidewalls, a twine handling assembly mounted between said sidewalls and forwardly of said opening, said twine handling assembly including at least one twine arm having a twine dispensing end from which twine is dispensed in the vicinity of said infeed opening and fed therethrough for applying a plurality of helical wraps on the cylindrical package of crop material formed in said chamber, said twine handling assembly further including means for controllably moving said twine arm to dispense twine across said opening from said twine dispensing end, and twine cutting apparatus having a twine cutting mechanism for cutting the twine, the improvement comprising said twine cutting apparatus including means for transferring said twine cutting mechanism from a remote inoperative position to an operative position adjacent one of said sidewalls.

2. A round baler as set forth in claim 1 wherein said means for transferring said twine cutting mechanism includes support means on which said twine cutting mechanism is mounted, and means for moving said support means from a first position to a second position whereby said twine cutting mechanism is transferred from its remote inoperative position to its operative position adjacent said one of said sidewalls.

3. A round baler as set forth in claim 2 wherein said support means comprise an arm having a distal end to which said twine cutting mechanism is attached, and pivot means for swinging said arm between said first and second positions.

4. A round baler as set forth in claim 3 wherein said arm is arranged between said pair of side walls in said first position and is generally parallel to said side walls in said second position.

5. A round baler as set forth in claim 4 wherein said distal end extends toward said crop infeed opening in said second position.

6. A round baler as set forth in claim 5 wherein said pivot means is mounted on said one of said pair of said side walls.

7. In a round baler comprising a chamber for forming a cylindrical package of crop material, a generally transverse crop infeed opening in said chamber, a pair of sidewalls, a twine handling assembly mounted between said sidewalls and forwardly of said opening, said twine handling assembly including at least one twine arm having a twine dispensing end from which twine is dispensed in the vicinity of said infeed opening and fed therethrough for applying a plurality of helical wraps on the cylindrical package of crop material formed in said chamber, said twine handling assembly further including means for controllably moving said twine arm to dispense twine across said opening from said twine dispensing end, twine cutting apparatus having a twine cutting mechanism for cutting the twine, and a twine guide assembly mounted on one of said side walls for guiding the twine to said cutting mechanism after a predetermined amount of twine has been dispensed, the improvement comprising said twine cutting apparatus including means for transferring said twine cutting mechanism from a remote inoperative position to an operative position adjacent said twine guide.

8. A round baler as set forth in claim 7 wherein said means for transferring said twine cutting mechanism includes support means on which said twine cutting mechanism is mounted, and means for moving said support means from a first position to a second position whereby said twine cutting mechanism is transferred from its remote inoperative position to its operative position adjacent said twine guide.

9. A round baler as set forth in claim 8 wherein said twine guide is mounted on one of said pair of side walls.

10. A round baler as set forth in claim 8 wherein said support means comprise an arm having a distal end to which said twine cutting mechanism is attached, and pivot means for swinging said arm between said first and second positions.

11. A round baler as set forth in claim 10 wherein said twine guide is mounted on one of said pair of side walls, and said pivot means is also mounted on one of said pair of side walls.

12. A round baler as set forth in claim 10 wherein said arm is arranged between said pair of side walls in said first position and is generally parallel to said side walls in said second position.

13. A round baler as set forth in claim 10 wherein said distal end extends toward said crop infeed opening in said second position.

14. A round baler as set forth in claim 13 wherein said pivot means is mounted on said one of said pair of said side walls.

* * * * *